United States Patent [19]

McCullough et al.

[11] Patent Number: 5,440,290

[45] Date of Patent: Aug. 8, 1995

[54] PROXIMITY DETECTION DEVICE FOR PROTECTION OF PERSONNEL AGAINST EXPOSURE TO HAZARDOUS RADIO FREQUENCY RADIATION

[75] Inventors: Charles E. McCullough, Woodbridge; Roy D. Follendore, III, Manassas, both of Va.

[73] Assignee: TECSEC Incorporated, Vienna, Va.

[21] Appl. No.: 72,777

[22] Filed: Jun. 7, 1993

[51] Int. Cl.$^6$ ............... G08B 13/18; G08B 23/00; G01S 15/00

[52] U.S. Cl. ............... 340/552; 340/527; 343/894; 367/93

[58] Field of Search ............... 340/552, 541, 691, 527, 340/552, 527; 307/116; 367/93; 455/115, 117; 343/703, 894

[56] References Cited

U.S. PATENT DOCUMENTS

| | | | |
|---|---|---|---|
| Re. 30,719 | 8/1981 | Mills | 187/52 R |
| 3,662,371 | 5/1972 | Lee et al. | 340/258 R |
| 3,728,670 | 4/1973 | Rosauer et al. | 340/1 R |
| 3,879,719 | 4/1975 | Buckley et al. | 340/258 B |
| 4,028,662 | 6/1977 | Young | 340/32 |
| 4,035,798 | 7/1977 | Hackett | 343/5 PD |
| 4,222,119 | 9/1980 | Brunner-Schwer | 455/140 |
| 4,263,665 | 4/1981 | Watts | 367/94 |
| 4,347,590 | 8/1982 | Heger et al. | 367/93 |
| 4,442,512 | 4/1984 | Kodera et al. | 367/87 |
| 4,528,563 | 7/1985 | Takeuchi | 340/903 |
| 4,570,247 | 2/1986 | Walker et al. | 367/93 |
| 4,604,735 | 8/1986 | Parsons | 367/93 |
| 4,658,385 | 4/1987 | Tsuji | 367/105 |
| 4,779,240 | 10/1988 | Dorr | 367/96 |
| 4,823,280 | 4/1989 | Mailandt et al. | 340/552 |
| 4,831,448 | 5/1989 | Park | 367/93 |
| 5,047,752 | 9/1991 | Schorn | 340/552 |
| 5,126,719 | 6/1992 | DeSorbo | 340/571 |
| 5,164,706 | 11/1992 | Chen | 340/571 |
| 5,172,093 | 12/1992 | Nose et al. | 340/527 |

*Primary Examiner*—John K. Peng
*Assistant Examiner*—Benjamin C. Lee
*Attorney, Agent, or Firm*—Thomas M. Champagne; Jon L. Roberts; Roberts & Associates

[57] ABSTRACT

A proximity detection device for protection of personnel against exposure to hazardous radio frequency radiation. The device works by detecting the presence of people, either the operator or bystanders, who are in the system antenna's radio frequency radiation hazard zone. Upon detection, the device triggers a timer that delays the activation of alarm circuitry for a brief period of time. This time delay is instituted to minimize the triggering of nuisance alarms by a momentary intrusion in the hazard zone. If a presence is still detected after the delay time, pulsing visual and audible alarms are triggered to alert the system operator of the dangerous situation. The alarms remain activated for a timed period, allowing the operator to clear the hazard zone. If the system of the present invention continues to detect a presence in the radio frequency radiation hazard zone after the timed alarm period, the alarms are set in constant activation and a relay is triggered deactivating the system transmitter, thereby removing the radio frequency radiation hazard.

19 Claims, 2 Drawing Sheets

PROXIMITY DETECTION DEVICE FOR PROTECTION OF PERSONNEL AGAINST EXPOSURE TO HAZARDOUS RADIO FREQUENCY RADIATION

FIELD OF THE INVENTION

The present invention relates generally to intrusion detection devices and more particularly to a proximity detection device for detecting the presence of a person within the hazard zone of a radio frequency transmitter. The device sets off an alarm when the presence of a person within the antenna beam is detected and shuts down the transmitter when such a presence persists for more than a safe amount of time.

BACKGROUND OF THE INVENTION

Satellite communications systems can emit non-ionizing radio frequency radiation (RFR) in the microwave region of the electromagnetic spectrum at intensities large enough to pose health hazards to exposed personnel. The type and severity of the potential health hazards are dependent on the emitted frequency and the intensity of the radiation, as well as the exposure time and the part(s) of the body exposed. The recognized mechanisms for adverse microwave health effects fall into the categories of thermal and non-thermal hazards. Thermal related hazards of RFR include: tissue burns, cataracts, testicular damage, and malignancies. The mechanisms and effects of low level (non-thermal) microwave RFR are not well known and remain controversial.

The microwave radiation emanating from a satellite earth station antenna in communication with a satellite or other earth station is very directional, that is, the energy is focused in a narrow beam. The intensity of the energy decreases rapidly as it travels away from the antenna. Even given this attenuation, levels exceeding the IEEE C95.1 standard maximum permissible exposure limits can exist several feet away from the antenna, and localized areas of increased intensity, called hotspots, having the potential to burn or shock can result due to the wave phenomenon called scattering.

Communication systems emitting microwave RFR at levels unsafe for human contact are in need of a device to guard personnel against these potential health hazards. Such a device is especially needed for mobile systems utilizing concealed antennas (e.g., briefcase lid mounted antennas) where, in the absence of a conspicuous antenna, bystanders may not be aware of the potential radiation hazard. The device should be one which surveys the hazard area and sets off an alarm if personnel enter this area. The device should also shut down the transmitter during an extended intrusion, but not during a momentary intrusion that may be caused, for example, by a bird quickly flying through the hazard area.

There are many known devices which detect the presence of intruders in a particular area and sound an alarm. For example, U.S. Pat. No. 5,164,706 to Chen discloses an alarm device for a briefcase or handbag. The device is attached to the briefcase by a strap. If someone approaches the briefcase and passes too near, sensors in the device detect a presence and cause an alarm to sound, deterring theft of the briefcase. U.S. Pat. No. 5,126,719 to DeSorbo discloses an alarm system for a briefcase or other item that is motion activated, causing an alarm to sound if the item containing the device is moved. The system can be remotely armed or disarmed by using a handheld transmitter/controller. U.S. Pat. No. 4,222,119 to Brunner-Schwer discloses an ultrasonic alarm that is hidden within an ordinary portable radio.

U.S. Pat. No. 4,658,385 to Tsuji discloses an obstacle detection system for mobile robots that uses ultrasonic transducers to detect and locate objects that may be obstacles for the robot, so that the robot can avoid the obstacles.

U.S. Pat. No. 4,604,735 to Parsons discloses an ultrasonic motion detection system for a faucet. Ultrasonic transducers are used to detect a person's hands below the faucet. A microprocessor circuit then opens a valve, automatically dispensing water from the faucet.

U.S. Pat. No. 4,570,247 to Walker et al. discloses an ultrasonic motion detector for use in intrusion alarms. Dual band ultrasonic transducers are used, and an alarm sounds only after motion is detected in both bands for more than a predetermined period. U.S. Pat. No. 4,263,665 to Watts also discloses an ultrasonic intrusion alarm system. The Watts system includes both sound and light alarms.

U.S. Pat. No. 4,528,563 to Takeuchi discloses a rearward obstruction sensing system for automobiles. Sensors on the automobile detect obstacles within warning zones proximate to the automobile, and sound an alarm when such an obstacle is detected. U.S. Pat. No. 4,442,512 to Kodera et al. also discloses an obstruction sensing system for automobiles, the system using ultrasonic transducers. U.S. Pat. No. 4,028,662 to Young discloses a device for automobiles which senses the presence of a car in an adjacent lane that is driving in the blind spot of the driver of the equipped automobile.

U.S. Pat. No. 4,035,798 to Hackett discloses an ultrasonic intrusion detection system that is designed to differentiate between moving targets and ambient noises that would cause false alarms. U.S. Pat. No. 3,662,371 to Lee et al. also discloses an ultrasonic intrusion detection system that differentiates between intrusions intended to cause alarm and those that should be ignored.

U.S. Pat. No. 3,879,719 to Buckley et al. discloses an intruder detection device. The device uses a UHF transmitter and an antenna producing a flat beam of radiated energy. This beam is either transmitted parallel to the ground covering the area under surveillance, or is transmitted perpendicular to the ground at the periphery of the area under surveillance. If the beam is broken by an intruder, the change in received energy at a UHF receiver causes an alarm to set off.

U.S. Pat. No. Re. 30,719 to Mills discloses an automatic sliding doorway safety device that uses acoustic wave transmitters and receivers to detect persons or objects near the doorway. The detection of a person or object near the doorway will cause the door to open automatically. If the door is already open and is in the process of closing, the detection of a person or object near the doorway will cause the door to remain open, avoiding injury to the person or object due to the closing door. U.S. Pat. No. 4,779,240 to Dorr discloses a similar doorway safety system for automatic swinging doors. This system distinguishes items that are normally near the doorway, such as railings, from persons in the doorway.

None of the listed references discloses a system which operates within a RFR hazardous region and warns an intruder of the danger of being in the region, warns a site operator of an intruder, or shuts down the transmitter in order to protect the intruder. Further, none of these systems are designed to match antenna patterns of hazardous emitting devices.

SUMMARY OF THE INVENTION

It is therefore an object of the present invention to provide a device which will detect the presence of a person or object within the hazard zone of a RFR transmitter.

It is a further object of the present invention to provide a device that automatically warns a person inside the hazard zone of an RFR transmitter.

It is an additional object of the present invention to provide a device that alerts the operator of an RFR transmitter to the presence of a person or object within the hazard zone of the transmitter.

It is another object of the present invention to provide a device that automatically shuts down an RFR transmitter if a person or object enters the hazard zone of the transmitter.

It is still a further object of the present invention to provide a device for the protection of personnel against exposure to hazardous RFR that includes a timing circuit that minimizes nuisance alarms due to momentary intrusions into the hazard zone.

These and other objects and advantages of the present invention will be apparent to those of ordinary skill in the art upon inspection of the summary, description, drawings, and appended claims.

The present invention is a RFR safety device that is contemplated for use with mobile earth stations, as part of an integrated set of RFR safety features. In addition to the installation of the device of the present invention, the mobile earth station should incorporate IEEE C95.2 RFR Hazard Warning Symbols installed on the chassis and include appropriate operating procedures and warnings in the system operator's manual.

The present invention works by detecting the presence of people, either the operator or bystanders, who are in the system antenna's RFR hazard zone. Upon detection, the device triggers a timer that delays the activation of alarm circuitry for a brief period of time. This time delay is instituted to minimize the triggering of nuisance alarms by a momentary intrusion in the hazard zone. If a presence is still detected after the delay time, pulsing visual and audible alarms are triggered to alert the system operator of the dangerous situation. The alarms remain activated for a timed period, allowing the operator to clear the hazard zone. If the system of the present invention continues to detect a presence in the RFR hazard zone after the timed alarm period, the alarms are set in constant activation and a relay is triggered deactivating the system transmitter, thereby removing the RFR hazard.

DETAILED DESCRIPTION OF THE INVENTION

Figure 1:
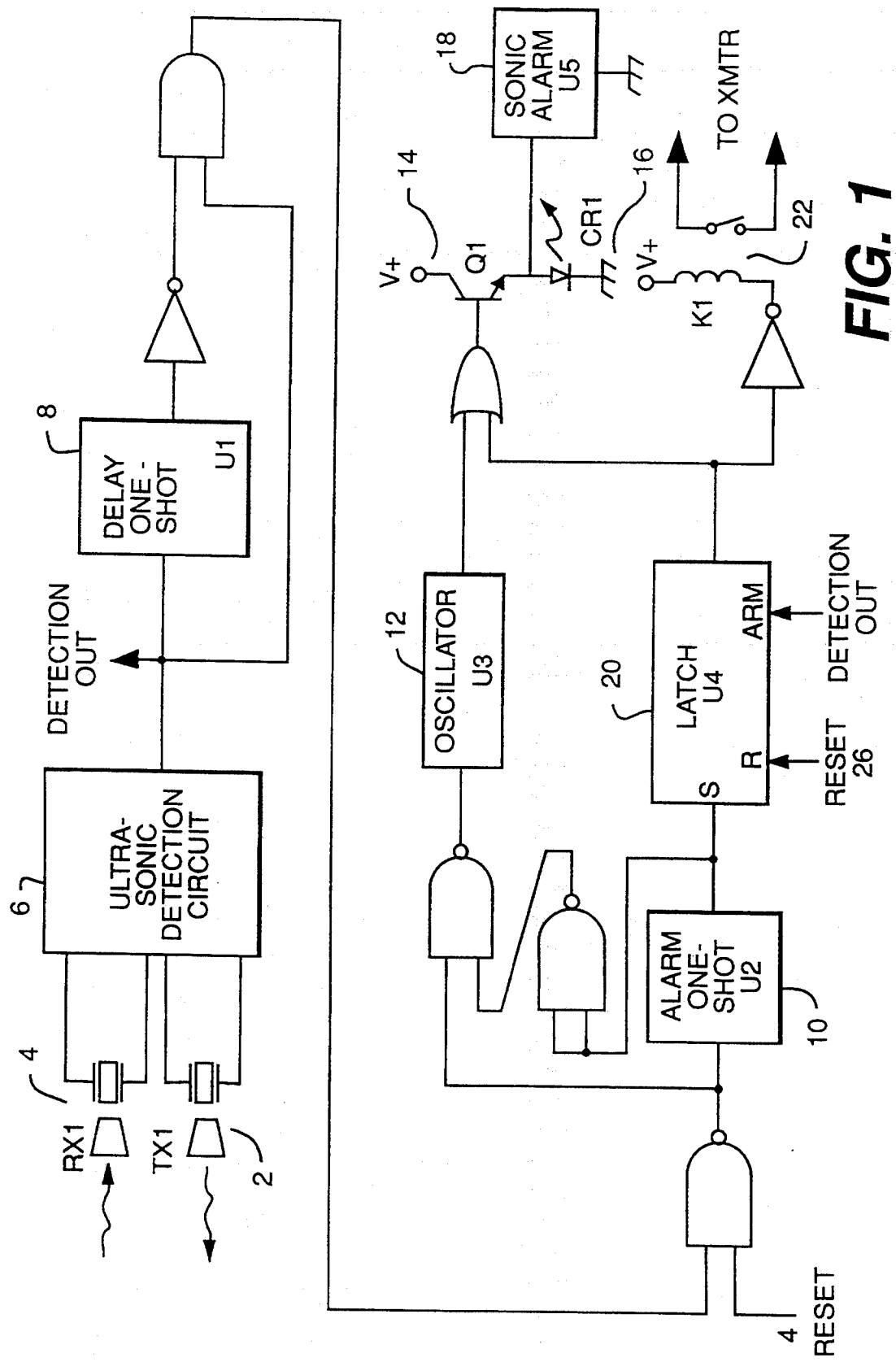
FIG. 1 shows a circuit block diagram of the system of the present invention.

Referring to FIG. 1 the system circuit block diagram is now described. The device uses detection circuitry, employing one or more sensor means, to detect a presence in the antenna RFR danger zone. The detection circuit may employ, as sensor means, ultrasonic, passive, infrared (IR), active IR, or other sensors, either individually or in combination. The sensor elements of the preferred embodiment have an angular response pattern that nearly matches the antenna beam pattern and the detection circuit's sensitivity is set to detect motion at a distance at which the RFR, which is expressed as a power density quantity, doesn't exceed the maximum permissible exposure limits. This safe distance is determined by direct measurement of the power density or by calculation using the theoretical effective isotropic radiated power of the communication system. This will define a predetermined area that the sensors of the present invention will monitor for the presence of a person or object.

The sensors used in the example illustrated in FIG. 1 are an ultrasonic transducer pair, transmitter 2 and receiver 4. An ultrasonic detection circuit 6 or other detection means connected to the sensor means controls sensor signal transmission and monitors sensor output signals at the receiver 4. Aberrations in the received sensor signal will be interpreted by the ultrasonic detection circuit 6 as an intrusion, causing the output of the detection circuit to go active, that is, to be asserted.

The activated output of the ultrasonic detection circuit triggers the delay one-shot 8 to begin a predetermined timed delay period prior to alarm activation. The delay is set so that detection circuit responses of a brief nature (caused by a bird flying through the hazard zone, for example.) will not trigger nuisance alarms.

If the hazard zone is cleared, causing the detection circuit 6 to become inactive, before the delay one-shot 8 times out, the alarms remain quiet and system operation continues uninterrupted.

If the detection circuit 6 is still active when the delay one-shot 8 times out, the alarm one-shot 10 is triggered to begin the predetermined timed alarm period. An oscillator 12 or other oscillating actuation means is also triggered, sending pulses to the alarm drive circuit 14 that energizes the alarm LED 16 and the audible alarm 18. Other visual output means and audible output means may be used to provide visual and audible outputs. Thus, during the timed alarm period, the transmitter is still enabled, but a pulsing visual and audible warning alarm is sent to the intruder and/or the operator, the alarm being actuated by the alarm drive circuit 14.

If the detection circuit 6 becomes inactive before the alarm one-shot 10 times out, the alarms are quieted and system operation continues uninterrupted.

If the detection circuit 6 is still activated when the alarm one-shot 10 times out, the oscillator 12 is deactivated and a latch 20 or other continuous actuation means is set, energizing the transmitter shutoff relay 22 or other switch means and sending a constant (non-pulsing) signal to the alarm drive circuit 14 and therefore to the LED and audible alarm 18. Thus, the LED and audible alarm light and sound continuously and the transmitter is disabled and shuts down.

While a particular circuit has been shown as the preferred embodiment, other circuit configurations may be used in conjunction with sensor means, transmitter switch means, and means for actuating the alarm LED and audible alarm. Any such circuit, employing detection means for interpreting a sensor output signal and timing means for controlling the transmitter shutoff relay 22 and alarm drive circuit 14 is contemplated for use with the present invention. Also, the sequence described for pulsing the alarms, providing continuous alarms, and turning off the transmitter, is the preferred sequence, but alternate sequences are contemplated. For example, the latch 20 may first be enabled, providing a continuous alarm until the delay one-shot 8 times out. At this point, the latch 20 may be disabled and the oscillator 12 enabled, providing a pulsing alarm. The particular sequence involved is not critical to the present invention.

A reset button 26 or other reset means is provided on the latch 20 to deactivate the alarms and the transmitter shutoff relay. When the reset button 26 is pushed, the RF transmitter will be enabled as long as the detection circuit 6 output signal is no longer asserted. A circuit test button 24 or other test means is also provided to test device operation while the transmitter is deactivated. When the circuit test button 24 is pushed, the alarm LED and audible alarm will be activated and the RF transmitter will be disabled, preferably in the sequence followed in normal operation.

Figure 2:
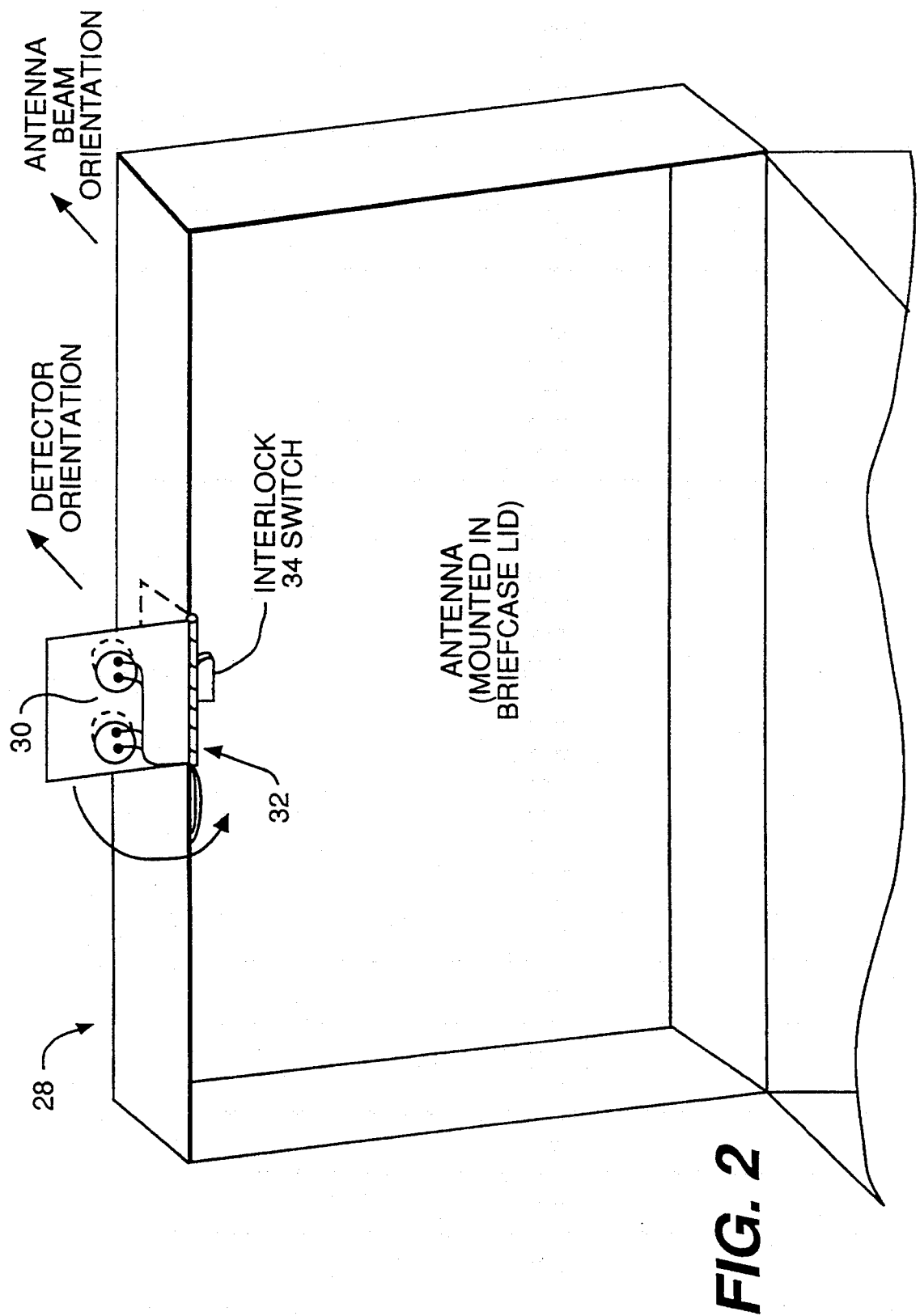
FIG. 2 shows a mechanical diagram of the present invention used in conjunction with a briefcase mounted transmitter.

Referring to FIG. 2, a mechanical diagram of the present invention used in conjunction with a briefcase mounted transmitter is now described. The system circuit is designed to be used with any system incorporating highly,directional antennas that emanate hazardous. RFR. For example, an ultrasonic version is shown integrated directly into a briefcase mounted satellite mobile earth station 28. The ultrasonic transmitter and receiver pair 30 are mounted on a hinged assembly 32 that is attached to the briefcase lid that houses the system antenna. The ultrasonic assembly is located so as to minimize interaction between the RF field and the ultrasonic elements.

The ultrasonic assembly incorporates a micro-switch interlock 34 that is connected to the earth station transmitter control circuitry. The interlock switch 34 automatically activates the ultrasonic assembly. Only when the ultrasonic assembly is unfolded and the interlock switch 34 is activated can the transmitter be used. The ultrasonic assembly folds into the lid of the briefcase when not in use.

The ultrasonic transmitter and receiver pair 30 are mechanically aligned so that their response pattern closely matches the antenna beam.

All the system circuitry of the present invention exclusive of the ultrasonic elements is mounted on a printed circuit board (PCB) located inside the body of the briefcase. A double-shielded wiring harness connects the ultrasonic elements to the PCB.

As previously stated, other types of sensors may be used with the present invention, and the system of the present invention is also contemplated for use with transmitter sites other than those mounted in a briefcase.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. A proximity detection device for use with a radio frequency radiation transmitter, the radio frequency transmitter providing a radio frequency output conforming to an antenna beam pattern, the proximity detection device comprising:
    A) a sensor disposed to detect the presence of a person within a predetermined area, the sensor providing a sensor output signal which indicates when the presence of a person is sensed within the predetermined area and the predetermined area being defined by a region substantially the same shape as the antenna beam pattern and within which the radio frequency output is greater than a predetermined level;
    B) a detector disposed to interpret the sensor output signal, the detector providing a detection output signal that is asserted when the sensor output signal indicates the presence of a person within the predetermined area; and
    C) a switch, connected to the detector, for disabling the radio frequency transmitter when the detection output signal is asserted.

2. The proximity detection device of claim 1, further comprising a visual output device disposed to provide a visual output when actuated.

3. The proximity detection device of claim 2, further comprising an audible output device disposed to provide an audible output when actuated.

4. The proximity detection device of claim 3, further comprising control logic disposed to actuate the visual output device and the audible output device when the detection output signal is asserted.

5. The proximity detection device of claim 4, further comprising a timer disposed to control the switch and the control logic.

6. The proximity detection device of claim 5, wherein:
    A) the control logic comprises an oscillator disposed to actuate the visual output device and the audible output device in a pulsing fashion;
    B) the control logic further comprises a continuous actuator disposed to actuate the visual output device and the audible output device in a continuous fashion; and
    C) the timer is adapted to enable and disable the oscillator, the continuous actuator, and the switch.

7. The proximity detection device of claim 6, wherein the timer is adapted to enable and disable the oscillator, the continuous actuator, and the switch in a sequence when the detection output signal is not asserted.

8. The proximity detection device of claim 4, further comprising reset logic disposed to enable the radio frequency transmitter when the detection output signal is not asserted.

9. The proximity detection device of claim 4, further comprising test logic disposed to actuate the visual output device and the audible output device and for disabling the radio frequency transmitter.

10. The proximity detection device of claim 1, further comprising an audible output device disposed to provide an audible output when actuated.

11. A proximity detection device for use with a radio frequency radiation transmitter, the radio frequency transmitter providing a radio frequency output conforming to an antenna beam pattern, the proximity detection device comprising:
    A) a sensor disposed to detect the presence of a person within a predetermined area, the sensor adapted to provide a sensor output signal which indicates when the presence of a person is sensed within the predetermined area and the predetermined area defined by a region substantially the same shape as the antenna beam pattern within which the radio frequency output is greater than a predetermined level;

B) a detector, disposed to interpret the sensor output signal, the detector providing a detection output signal that is asserted when the sensor output signal indicates the presence of a person within the predetermined area;

C) a visual output device disposed to provide a visual output when actuated;

D) an audible output device disposed to provide an audible output when actuated;

E) control logic connected to the detector, the visual output device, and the audible output device and adapted to actuate the visual output device and the audible output device when the detection output signal is asserted; and F) a switch disposed to disable the radio frequency transmitter when the detection output signal is asserted.

12. The proximity detection device of claim 11, further comprising a timer, connected to the detector, the switch, and the control logic and adapted to control the switch and the control logic.

13. The proximity detection device of claim 12, wherein:

A) the control logic comprises an oscillator disposed to actuate the visual output device and the audible output device in a pulsing fashion;

B) the control logic further comprises a continuous actuator disposed to actuate the visual output device and the audible output device in a continuous fashion; and C) the timer is adapted to enable and disable the oscillator, the continuous actuator, and the switch.

14. The proximity detection device of claim 13, wherein the timer is adapted to enable and disable the oscillator, the continuous actuator, and the switch in a sequence when the detection output signal is asserted.

15. The proximity detection device of claim 11, further comprising reset logic disposed to enable the radio frequency transmitter when the detection output signal is not asserted.

16. The proximity detection device of claim 11, further comprising test logic disposed to actuate the visual output device and the audible output device and for disabling the radio frequency transmitter.

17. A method for protecting personnel against exposure to hazardous radio frequency radiation, the radio frequency radiation conforming to an antenna beam pattern, comprising:

A) sensing the presence of a person within a predetermined area, the predetermined area defined by a region substantially the same shape as the antenna beam pattern and within which the radio frequency radiation is greater than a predetermined level;

B) asserting a detection signal as long as the presence of the person is sensed within the predetermined area;

C) waiting a predetermined amount of time; and

D) disabling a source of the radio frequency radiation if the detection signal is still asserted.

18. The method for protecting personnel against exposure to hazardous radio frequency radiation of claim 17, further comprising the following before disabling the source of the radio frequency radiation:

A) turning on an alarm if the detection signal is still asserted; and

B) waiting a second predetermined amount of time.

19. The method for protecting personnel against exposure to hazardous radio frequency radiation of claim 18, further comprising turning on the alarm in a different manner if the detection signal is asserted after waiting the second predetermined amount of time.

* * * * *